United States Patent
Haba

(10) Patent No.: US 6,275,912 B1
(45) Date of Patent: Aug. 14, 2001

(54) METHOD AND SYSTEM FOR STORING DATA ITEMS TO A STORAGE DEVICE

(75) Inventor: Erez Haba, Haifa (IL)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/114,228

(22) Filed: Jun. 30, 1998

(51) Int. Cl.[7] .................................................. G06F 12/00
(52) U.S. Cl. ........................... 711/154; 711/158; 709/213
(58) Field of Search .................................... 711/154, 158; 370/390, 393, 394, 905, 473, 412, 413, 428, 429; 709/213–216

(56) References Cited

U.S. PATENT DOCUMENTS

| | | | |
|---|---|---|---|
| 4,499,576 | * 2/1985 | Fraser | 370/412 |
| 4,584,679 | 4/1986 | Livingston et al. | 714/749 |
| 4,623,886 | 11/1986 | Livingston | 340/825.5 |
| 4,656,474 | 4/1987 | Mollier et al. | 713/181 |
| 4,736,369 | 4/1988 | Barzilai et al. | 370/231 |
| 4,769,815 | 9/1988 | Hinch et al. | 370/236 |
| 5,063,562 | 11/1991 | Barzilai et al. | 370/231 |
| 5,163,131 | * 11/1992 | Row et al. | 709/202 |
| 5,193,090 | 3/1993 | Filipiak et al. | 370/440 |
| 5,247,676 | 9/1993 | Ozur et al. | . |
| 5,285,445 | * 2/1994 | Lehnert et al. | 370/413 |
| 5,287,103 | 2/1994 | Kasprzyk et al. | 340/825.52 |
| 5,367,523 | 11/1994 | Chang et al. | 370/235 |
| 5,465,328 | 11/1995 | Dievendorff et al. | 714/15 |
| 5,526,358 | 6/1996 | Gregerson et al. | 709/221 |
| 5,526,489 | 6/1996 | Nilakantan et al. | 709/228 |
| 5,546,391 | 8/1996 | Hochschild et al. | 370/413 |
| 5,555,415 | 9/1996 | Allen | 709/300 |
| 5,557,748 | 9/1996 | Norris | 709/220 |
| 5,572,522 | * 11/1996 | Calamvokis et al. | 370/390 |
| 5,572,582 | 11/1996 | Riddle | 379/202 |
| 5,613,155 | * 3/1997 | Baldiga et al. | 710/5 |
| 5,627,766 | 5/1997 | Beaven | 702/122 |
| 5,758,184 | * 5/1998 | Lucovsky et al. | 710/6 |
| 5,761,507 | 6/1998 | Govett | . |
| 5,764,625 | 6/1998 | Bournas | 370/231 |
| 5,777,987 | 7/1998 | Adams et al. | 370/336 |
| 5,778,384 | 7/1998 | Provino et al. | 707/200 |
| 5,793,861 | 8/1998 | Haigh | 379/266 |
| 5,812,819 | 9/1998 | Rodwin et al. | 395/500.44 |
| 5,815,667 | 9/1998 | Chien et al. | 709/232 |
| 5,819,042 | 10/1998 | Hansen | 709/222 |
| 5,828,653 | 10/1998 | Goss | 370/230 |
| 5,835,727 | 11/1998 | Wong et al. | 709/238 |
| 5,838,907 | 11/1998 | Hansen | 709/220 |
| 5,845,081 | 12/1998 | Rangarajan et al. | 709/224 |
| 5,854,901 | 12/1998 | Cole et al. | 709/245 |
| 5,864,669 | 1/1999 | Osterman et al. | . |
| 5,872,968 | 2/1999 | Knox et al. | 713/2 |
| 5,875,301 | 2/1999 | Duckwall et al. | 710/8 |
| 5,875,306 | 2/1999 | Bereiter | 709/220 |
| 5,878,056 | 3/1999 | Black et al. | 371/32 |

(List continued on next page.)

OTHER PUBLICATIONS

Blakeley et al., *Messaging and Queuing Using the MQI*, McGraw Hill, Inc.; New York, NY, 1995.

(List continued on next page.)

Primary Examiner—Reginald G. Bragdon
Assistant Examiner—Matthew G. Anderson
(74) Attorney, Agent, or Firm—Leydig, Voit & Mayer, LTD

(57) ABSTRACT

A system and method for efficiently storing data items to a storage device, such as hard disk, uses a data collector and a data writer running in different threads. A data source produces a stream of write requests to write data items to the storage device. The write requests are passed to the data collector, which accumulates, orders, and consolidates the write requests in a data structure. The data writer handles the operation of writing data to the storage device. The ordered and consolidated data items are then given to the data writer, which writes them to the storage device.

69 Claims, 7 Drawing Sheets

U.S. PATENT DOCUMENTS

| | | | |
|---|---|---|---|
| 5,881,051 | 3/1999 | Arrowood et al. | 370/248 |
| 5,901,138 | 5/1999 | Bader et al. | 370/229 |
| 5,920,697 | 7/1999 | Masters et al. | 709/219 |
| 5,922,049 | 7/1999 | Radia et al. | 709/220 |
| 5,930,479 | 7/1999 | Hall | 709/238 |
| 5,956,340 * | 9/1999 | Afek et al. | 370/412 |
| 5,987,496 * | 11/1999 | Shen et al. | 709/200 |

OTHER PUBLICATIONS

Douglas E. Comer, *Interneting with TCP/IP, vol. 1: Principles, Protocols and Architecture, Second Edition*, Chapter 19, 1991.

Andrew S. Tanenbaum, *Computer Networks, Third Edition*, Prentice Hall, New Jersey; pp. 577–622, 1996.

Lam, Richard B., "Shared Memory and Message Queues", *Dr. Dobb's Journal on CD–Rom*, Mar. 1995 pp. 2–3.

Newton, Harry, *Newton's Telecomm Dictionary, 8$^{th}$ Ed*, Flatiron Publishing, 1994, pp. 333 and 870.

*Microsoft Message Queuing Services: A Guide to Reviewing Microsoft Message Queuing Service Release 1.0*, Microsoft Corporation, Redmond, Washington, 1997.

Comer, Douglas E., *Internetworking With TCP/IP vol. 1: Principles, Protocols, and Architecture*, Chapter 6: Determining an Internet Address at Startup (RARP) and Chapter 18: Client–Server Model of Interaction, pp. 83–88, 293–309, Prentice–Hall, Englewood Cliffs, New Jersey, 1991.

Bernaloh, Josh et al, *The Private Communication Technology (PCT) Protocol*, Internet Draft, available from http://premium.microsoft.com/msdn/library/bkgrnd/html/pct/hml, Oct., 1995.

Marshall, Martin, "Microsoft Updates Falcon Beta", *Internetweek*, Issue 653, Mar. 10, 1997.

Bowen, Ted Smalley, "Asynchronous Messaging Pushes to the Fore", *Infoworld*, Feb. 23, 1998. Available from http://www.infoworld.com/cgi–bin/displayTC.pl?/980223sbl–async.htm.

Biggs, Maggie, "Applications Released from Platform Confines: Message Queuing Exchanges Data Between Apps Regardless of Platform", *Infoworld*, Feb. 23, 1998. Available from http://infoworld.com/cgi–bin/displayTC.pl?/980223analysis.htm.

*Using MSMQ as an RPC Transport*, Microsoft Corporation, 1997.

Tarjan, Robert Endre, *Data Structures and Network Algorithms*, Chapter 3: Heaps, pp. 33–43, Society for Industrial and Applied Mathematics, Philadelphia, Pennsylvania, 1993.

*Microsoft Message Queue Server 1.0 Release Notes*, Microsoft Corporation, Redmond Washington, 1997.

*Microsoft Message Queue Server: A Guide to Reviewing and Evaluation Microsoft Message Queue Server Beta 2 Release*, Microsoft Corporation, Redmond, Washington, 1997.

Richter, Jeffrey, *Advanced Windows: The Professional Developers Guide to the Win32 API for Windows NT 4.0 and Windows 95*, Chapter 11: Window Messages and Asynchronous Input, pp. 461–528, Microsoft Press, Redmond, Washington, 1997.

Sinha, Alok K., *Network Programming in Windows NT*, Chapter 5: Windows Sockets in Windows NT, pp. 199–299, Addison–Wesley Publishing Company, Reading, Massachusetts, 1996.

Gilman, Len and Schreiber, Richard, *Distributed Computing with IBM MQSeries*, John Wiley & Sons, New York, New York, 1997.

Blakeley, Burnie; Harris, Harry, and Lewis, Rhys, *Messaging & Queuing Using the MQI*, McGraw–Hill Inc., New York, New York, 1995.

* cited by examiner

FlushViewOfFile

The FlushViewOfFile function writes to the disk a byte range within a mapped view of a file.

```
BOOL FlushViewOfFile(
  LPCVOID lpBaseAddress,      // start address of byte range to flush
  DWORD dwNumberOfBytesToFlush // number of bytes in range
);
```

Parameters
lpBaseAddress
    Pointer to the base address of the byte range to be flushed to the disk representation of the mapped file.
dwNumberOfBytesToFlush
    Specifies the number of bytes to flush.
If dwNumberOfBytesToFlush is zero, the file is flushed from the base address to the end of the mapping.

Return Values
    If the function succeeds, the return value is nonzero.

If the function fails, the return value is zero. To get extended error information, call GetLastError.

Remarks
    Flushing a range of a mapped view causes any dirty pages within that range to be written to the disk. Dirty pages are those whose contents have changed since the file view was mapped.

When flushing a memory-mapped file over a network, FlushViewOfFile guarantees that the data has been written from the local computer, but not that the data resides on the remote computer. The server can cache the data on the remote side. Therefore, FlushViewOfFile can return before the data has been physically written to disk. However, you can cause FlushViewOfFile to return only when the physical write is complete by specifying the FILE_FLAG_WRITE_THROUGH flag when you open the file with the CreateFile function.

FIG. 5-FlushViewOfFile

METHOD AND SYSTEM FOR STORING DATA ITEMS TO A STORAGE DEVICE

FIELD OF THE INVENTION

This invention relates to computer programming and systems, and more particularly to an automated method and computer apparatus for efficiently consolidating and storing data items to a storage device.

BACKGROUND OF THE INVENTION

Users of computers are demanding increased reliability and performance of their applications running on their computers. One bottleneck in a computer system is the rate at which hardware devices operate, including the rate at which an application program can store its data to them.

Alternatively, an application program could store its data in the random access memory (RAM) of the computer which typically provides access at a rate several orders of magnitude faster than that of a data file on a hard disk drive. However, RAM does not provide the data persistence and reliability of hardware devices in the advent of computer or application problems. Should an application or the computer crash, this data store in RAM is typically lost which is unacceptable to many applications. Thus, computer users and developers are desirous of more efficient and faster methods for storing their information to these hardware devices.

In attempting to provide both faster access and data persistence and reliability, memory-mapped files have been developed. Memory-mapped files provide a way for an application program to access data at rates approximating accessing RAM, while providing reliability as the data is also stored on a file on a hardware device (usually a hard disk drive). Memory-mapped files accomplish this by maintaining a file and its mirror image in RAM and on a hardware device. Once a file has been mapped by an application program into its virtual address space, the application can access it using memory pointers. Any modifications to the data in memory are updated to the hardware device using the operating system paging and caching mechanisms. Current techniques are inefficient, and users are desirous of increased speed and data integrity of these techniques.

Traditional data paging and caching methods operate by updating entire pages of memory when a single data element within the page has been modified (i.e., the page has become "dirty"). For example, Windows NT uses a lazy method of flushing the memory to the disk and writes entire pages at a time, rather than only the individually changed elements.

In other computing applications that update individual elements within a random access file, the storage of the data items to disk operates in a linear fashion. In this approach, a first data element is updated on disk, then a second data element, and so on. While this approach is simplistic, this method does not optimize the writing of these data elements to disk. In fact, the processing overhead is so high that the linear data writing approach does not allow data to be written at the fastest rate allowed by the hardware. Rather, the data logging rate is limited by software processing of individual write operations. A solution is needed for writing and reading of a large amount of data elements at random locations on a hardware device or within a file on a hardware device at high rates of speed which approach the physical limitations of the hardware device to which the data is being stored.

SUMMARY OF THE INVENTION

According to the invention, an automated method and computer apparatus are disclosed for efficiently writing data items to a hardware device. To increase the performance of writing to random portions of a hardware device (e.g., a disk drive) or within one or more files on the hardware device, an optimal data storage method is used to efficiently accumulate, consolidate and write data elements to the hardware device at a rate which approximates the maximum rate that the hardware device can support, which cannot be achieved using traditional data writing methods. In one embodiment, the present invention is used to maintain the hardware device image of a memory-mapped file by efficiently writing the modified data items to the storage device. In one configuration, these data items correspond to messages in a message queuing environment.

To overcome the processing limitations of the traditional methods, the performance of a write operation is divided between a data collector and a data writer which operate in different threads. These threads can either be within the same process or in different processes. The data writer manages the writing of the data elements to the hardware device, while the data collector accumulates, orders and consolidates the data items for efficient storage by the data writer. The data collector can either be part of an application program, or within a separate thread as part of a device driver.

Any data items to be written to disk are passed to the data collector from a data source (e.g., an application program, device driver, some other thread or process, or the like). Because the data storage rate of the hardware device is relatively slow compared to a write to RAM especially when random portions of a hardware device are accessed, the present invention employs a method to keep the data writer storing data to the disk. Moreover, because writing larger blocks of contiguous data items is more efficient than a plurality of write operations on individual contiguous data items, the data collector consolidates accumulated multiple write requests for contiguous data items into a single write request. In another embodiment, the consolidation of write requests is performed by the data writer.

Whenever the data writer has no more data items to store to the hardware device and the data collector has one or more items, the data writer acquires these one or more items and proceeds with storing them to the hardware device. While the data writer is busy, the data collector receives new write requests from the data source, and accumulates, consolidates and orders them for efficient storing to the hardware device. In this manner, the present invention efficiently stores a stream of write requests received by the data collector to the hardware device by adjusting to the storage locations of the accumulated data items, the CPU speed, and the storage rate of the hardware device. In one embodiment in a particular Windows NT configuration, a twenty fold increase in writing the stream of data items (a rate of 1500 per second) was realized using the present invention over storage operations for individual data items (a rate of 70 per second). In addition, gains of twenty-five to forty times have been achieved using the present invention when storing a large stream of data items to a hardware device.

These write requests typically include the location to store the data item and the value of the data item. Alternatively, in a manner more efficient for use with memory-mapped files, the write request includes the memory address of the data item and the length of the data item.

In one embodiment, the data collector receives and maintains the write requests in a data structure in sorted order by storage location (or memory address). This allows the data collector to readily determine when two data items are contiguous. The data collector consolidates these write requests for contiguous data items into a single write request with a larger data item.

Whenever the data writer has no more write requests, the data writer acquires the write requests stored in the data structure in the data collector. In one embodiment, the data collector locks the data collector's data structure, copies the write requests to its own data structure, and then resets and releases the data collector's data structure. Many other techniques and semaphores could be used in keeping within the scope and spirit of the invention for passing the data between the data collector and the data writer. For example, multiple data structures could be used where the data writer is passed a pointer to a non-empty data structure and the data collector is passed a pointer to an empty data structure to fill. Also, object-oriented techniques could be employed such as maintaining a data structure as an object, where pointers to data structure objects and/or their interfaces are passed from the data collector to the data writer.

The data writer then stores the data values corresponding to the write requests kept in the acquired data structure. In one embodiment operating with the Windows NT operating environment, the FlushViewOfFile function, described in detail hereinafter, is used to write to a disk a byte range within a mapped view of a file.

For purposes of this disclosure, the invention will be discussed in terms of a single data source, single data collector, and single data writer. However, as would be obvious to one skilled in the art, multiple data sources, collectors, and/or writers could be used in keeping within the scope and the spirit of the invention.

The present invention also includes employing the optimized data storage techniques in the message queuing environment, such as Microsoft Message Queue Server (MSMQ). MSMQ makes it easy for application programs to quickly, reliably, and asynchronously send and receive messages. Messages are sent between queues in a message queuing environment. By maintaining a message queue using a memory-mapped file with the data storage technique disclosed herein, the messages are more efficiently and reliably maintained than provided for by previous techniques and systems. The faster a MSMQ message is flushed to persistent storage in a hardware device, the more reliable the messaging system as fewer messages will be lost upon a system failure. Moreover, the optimized performance provided by the present invention allows the use of a single memory-mapped file for multiple queues (thus multiple asynchronous writers) storing variable length messages; where the memory-mapped file is maintained using a single data collector and writer pair cooperating to efficiently update the disk image of the file.

BRIEF DESCRIPTION OF THE DRAWINGS

The appended claims set forth the features of the present invention with particularity. The invention, together with its advantages, may be best understood from the following detailed description taken in conjunction with the accompanying drawings of which:

FIG. 5 describes the FlushViewOfFile Windows NT command.

DETAILED DESCRIPTION OF THE PREFERRED EMBODIMENT

Figure 1A:
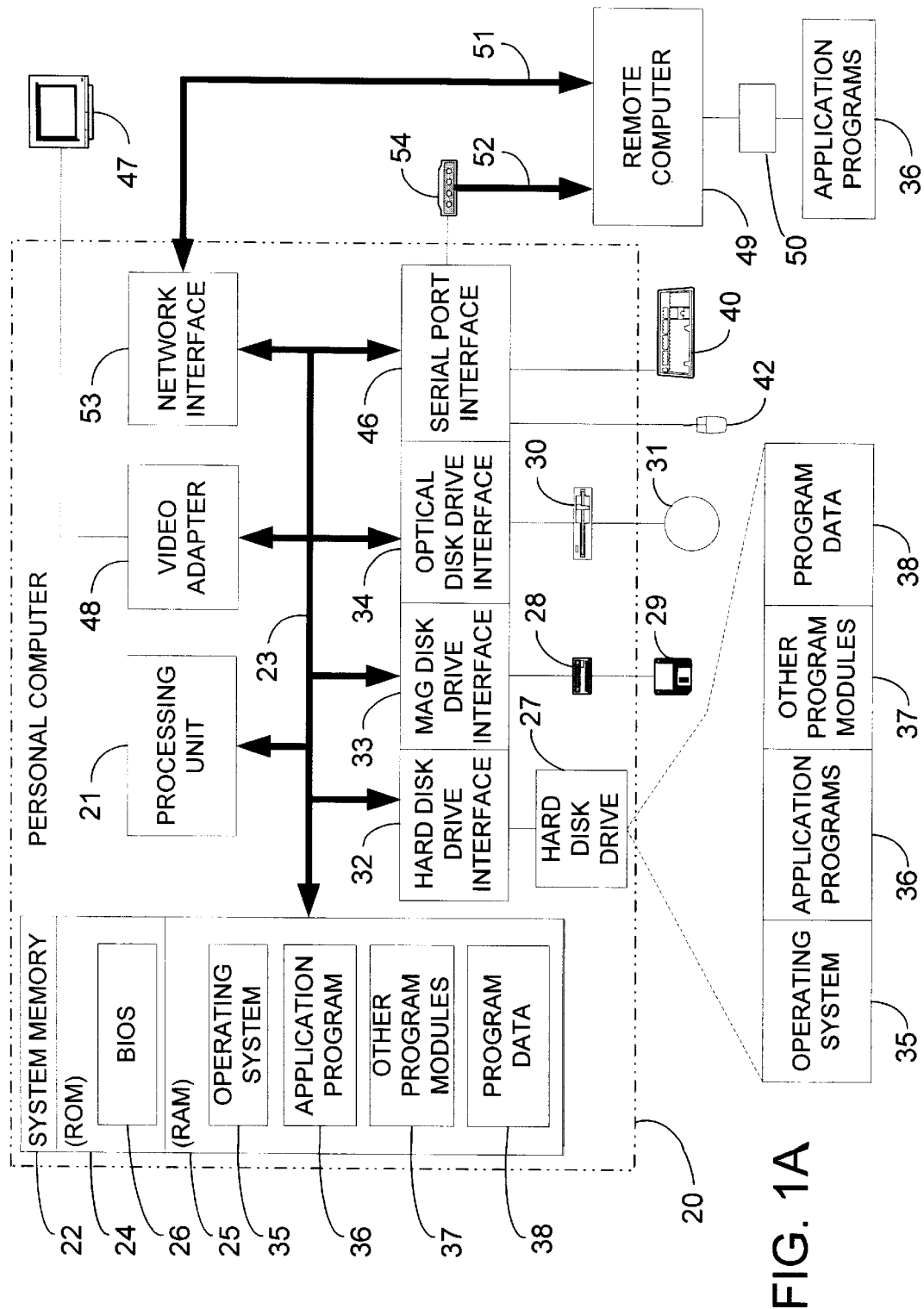
FIG. 1A is a block diagram of an exemplary operating environment in which the invention may be implemented, including a computer system for optimized writing of data items and flushing a memory-mapped file to a hardware device.

FIG. 1 and the following discussion are intended to provide a brief, general description of a suitable computing environment in which the invention may be implemented. Although not required, the invention will be described in the general context of computer—executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS) containing the basic routines that helps to transfer information between elements within the personal computer 20, such as during start-up, is stored in ROM 24. In one embodiment of the present invention, commands are stored in system memory 22 and are executed by processing unit 21 for the data collector and data writer threads, and for maintaining message queues and memory-mapped files in the efficient manner disclosed herein. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be collected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

According to the present invention, a method and apparatus are provided for efficiently storing data items to a hardware device using data collector and data writer threads. A data source produces a stream of write requests corresponding to data values to be written to various locations on a hardware device. A data collector is used which is either separate from or a part of the data source thread, process or application. The data collector accumulates, orders and consolidates the write requests in a data structure. Whenever the data writer has no more data items to store to the hardware device and there are items within the data structure, the data collector acquires the items in the data structure and proceeds with storing them to the hardware device. In this manner, the disk writer is always storing data items to the hardware device when possible. While the data writer is busy, the data collector receives and accumulates new write requests from the data source, and consolidates data items to be stored contiguously into single write requests.

The present invention operates in most any computer environment such as Windows NT which supports writing to hardware devices. A message queuing computer environment, such as Microsoft Message Queue Server environment (MSMQ), can advantageously incorporate the efficient storage techniques. A brief introduction of message queuing is provided below. A more detailed explanation of MSMQ is described in "Microsoft Message Queue Server (MSMQ)," MSDN Library—April 1998, Microsoft Corporation, and is hereby incorporated by reference.

MSMQ implements asynchronous communications by enabling applications to send messages to, and receive messages from, other applications. These applications may be running on the same machine or on separate machines connected by a network. MSMQ messages can contain data in any format that is understood by both the sender and the receiver. When an application receives a request message, it processes the request by reading the contents of the message and acting accordingly. If required, the receiving application can send a response message back to the original requester.

While in transit between senders and receivers, MSMQ keeps messages in holding areas called queues, hence the name message queuing. MSMQ queues protect messages from being lost in transit and provide a place for receivers to look for messages when they are ready. Applications make requests by sending messages to queues associated with the intended receiver. If senders expect responses in return, they must include the name of a response queue (that the sender must create in advance) in all requests that they make to the receiver.

Figure 1B:
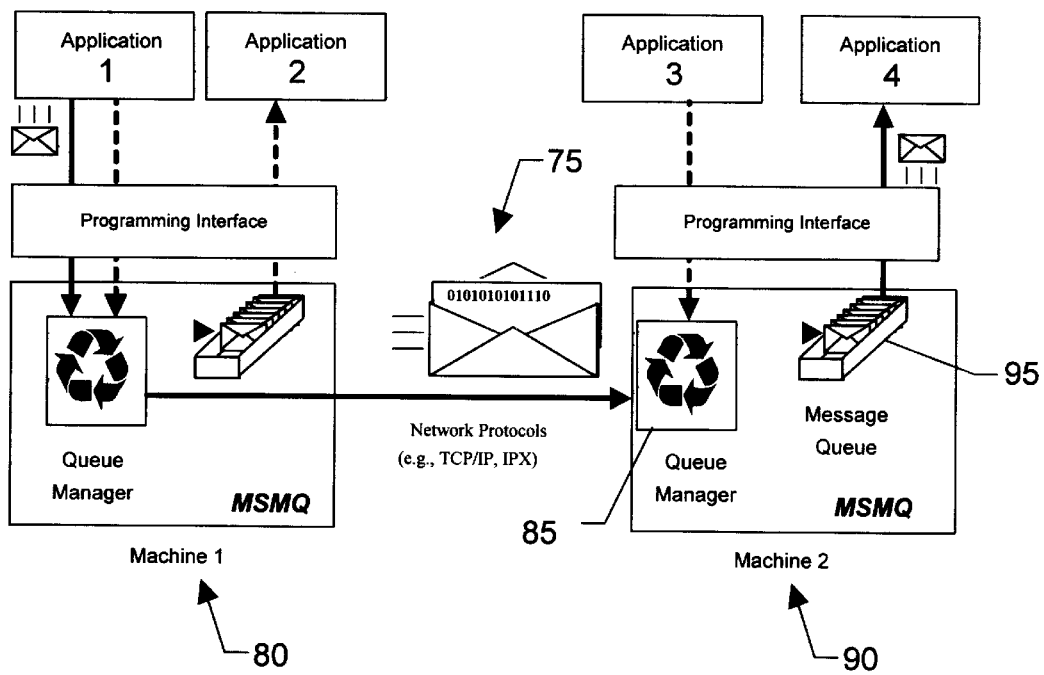
FIG. 1B is a block diagram illustrating the transmission of messages in a message queuing environment which advantageously uses the present invention to reliably maintain messages within its queues.

Turing now to FIG. 1B, shown is a block diagram illustrating the basics of the transportation of a message 75 from message queuing machine 1 (computer 80) to machine 2 (computer 90) over a transport network supporting such network transport protocols as TCP/IP or IPX. Each computer 80 and 90 perform both server and client operations for transferring messages 75 between their respective message queues. The queue manager 85 uses the efficient storage techniques described herein to more efficiently and reliably maintain its message queues.

Figure 2A:
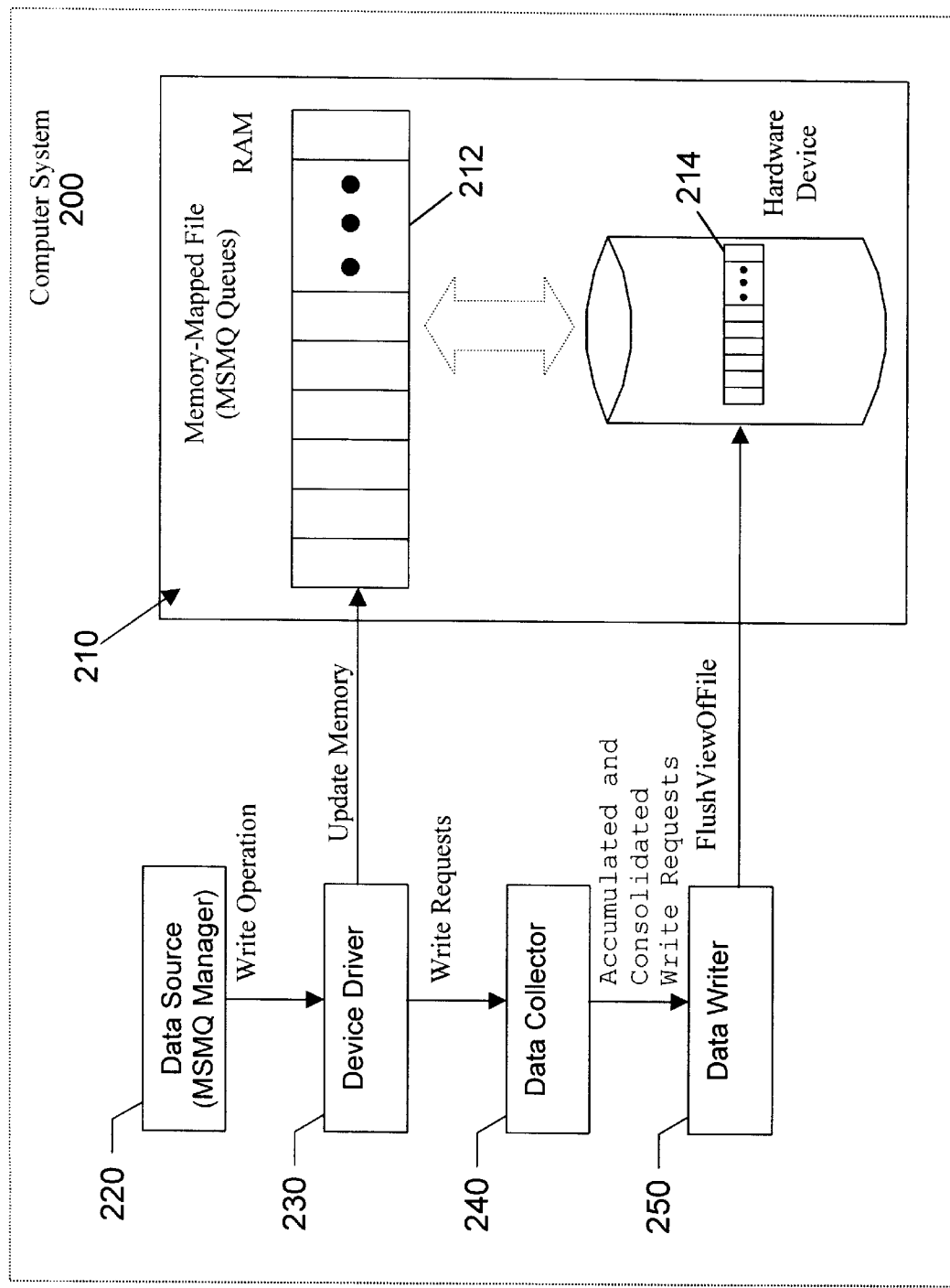
FIG. 2A is a block diagram of an embodiment illustrating the use of the present invention with memory-mapped files.

Turning now to FIG. 2A, shown is a block diagram of an embodiment of the present invention implemented on a computer system 200 for efficiently maintaining a memory-mapped file 210 (which could correspond to one or more message queues). As illustrated, the hardware device image 214 of the memory-mapped file is maintained in step with the RAM portion 212.

First, a data source 220 (such as a MSMQ Queue Manager) performs a write operation to the memory-mapped file 210. As shown, this write operation is performed by a device driver 230 which updates the RAM image 212 of the memory-mapped file 210 and generates a write request to a data collector 240. In one embodiment, the MSMQ Queue Manager data source 220 maintains the set of unused and/or used memory locations within the memory-mapped files in a data structure (e.g., an array, a bitmap, a linked list, etc.). Upon receipt of a MSMQ message, the MSMQ Queue Manager data source 220 then determines where in the memory-mapped file 210 to store the message based on the size of the message, available memory locations, etc.

Figure 2B:
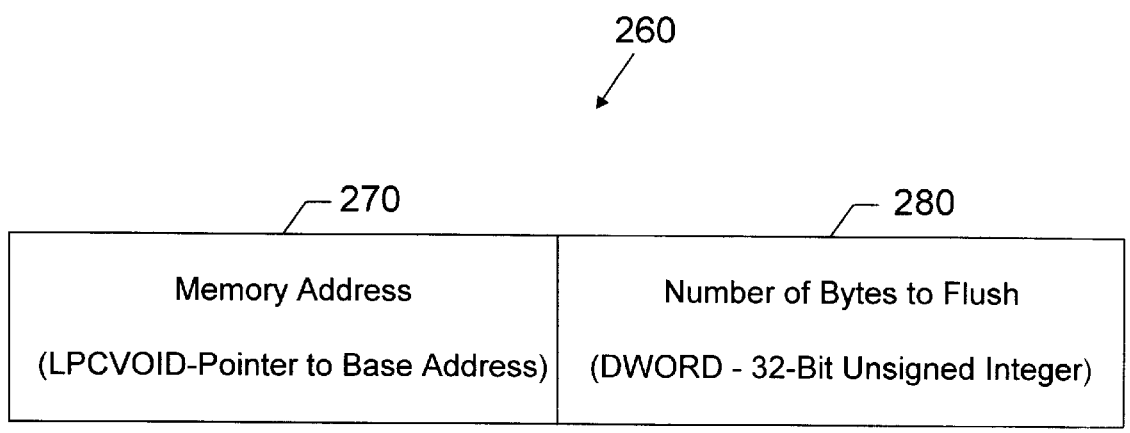
FIG. 2B is a block diagram illustrating the format of a write request used in optimized flushing of a memory-mapped file to a hardware device.

Briefly turning to FIG. 2B, shown is the format of one embodiment of a write request 260 which is particularly suited for the embodiment shown in FIG. 2A. As illustrated, write request 260 comprises two fields. The first field is a memory address field 270 which contains a pointer to the base address of the RAM image 212 of the memory-mapped file 210 (FIG. 2A) (i.e., the memory offset value from the base address in the process). The second field is a number of bytes to flush field 280. Using these fields 270, 280 for a plurality of write requests 260 and simple algebraic processing, write requests 260 corresponding to contiguous memory locations within the RAM image 212 are easily determined. Two such contiguous write requests 260 can then be merged into a single write request 260 using the lesser value of the two memory address fields 270, and a summation of the two number of bytes to flush fields 280.

Returning to FIG. 2A, the data collector 240 receives the stream of write requests 260, accumulates and consolidates the write requests 260 in a data structure. Data writer 250, operating in parallel and in a separate thread than the data collector 240, stores previously acquired write requests to the hardware device 214 (i.e., disk drive). When the data writer 250 had no more data items to store, the data writer 250 acquires the newly received accumulated and consolidated write requests from the data collector 240. In this manner, the data writer 250 is always storing data items to hardware device 214 whenever possible. In addition, the parallel collecting, consolidating and arranging of the write requests to match the characteristics of the hardware device increases the effective data storage rate.

The embodiment shown in FIG. 2A is just one of many possible configurations in keeping with the scope and spirit of the present invention. For example, the data source 220, data collector 240, and data writer 250 could be part of the same application program or process, or some of these functions being performed by other applications, processes, an operating system, device drivers, libraries, or other computer routines. The device driver 230 could be eliminated, with its described function performed by the data source 230 or data collector 240, for example. Moreover, these components could be written using many different programming techniques and methodologies (e.g., as structured programming, object-oriented programming), and developed using various programming languages and operating environments.

Figure 3:
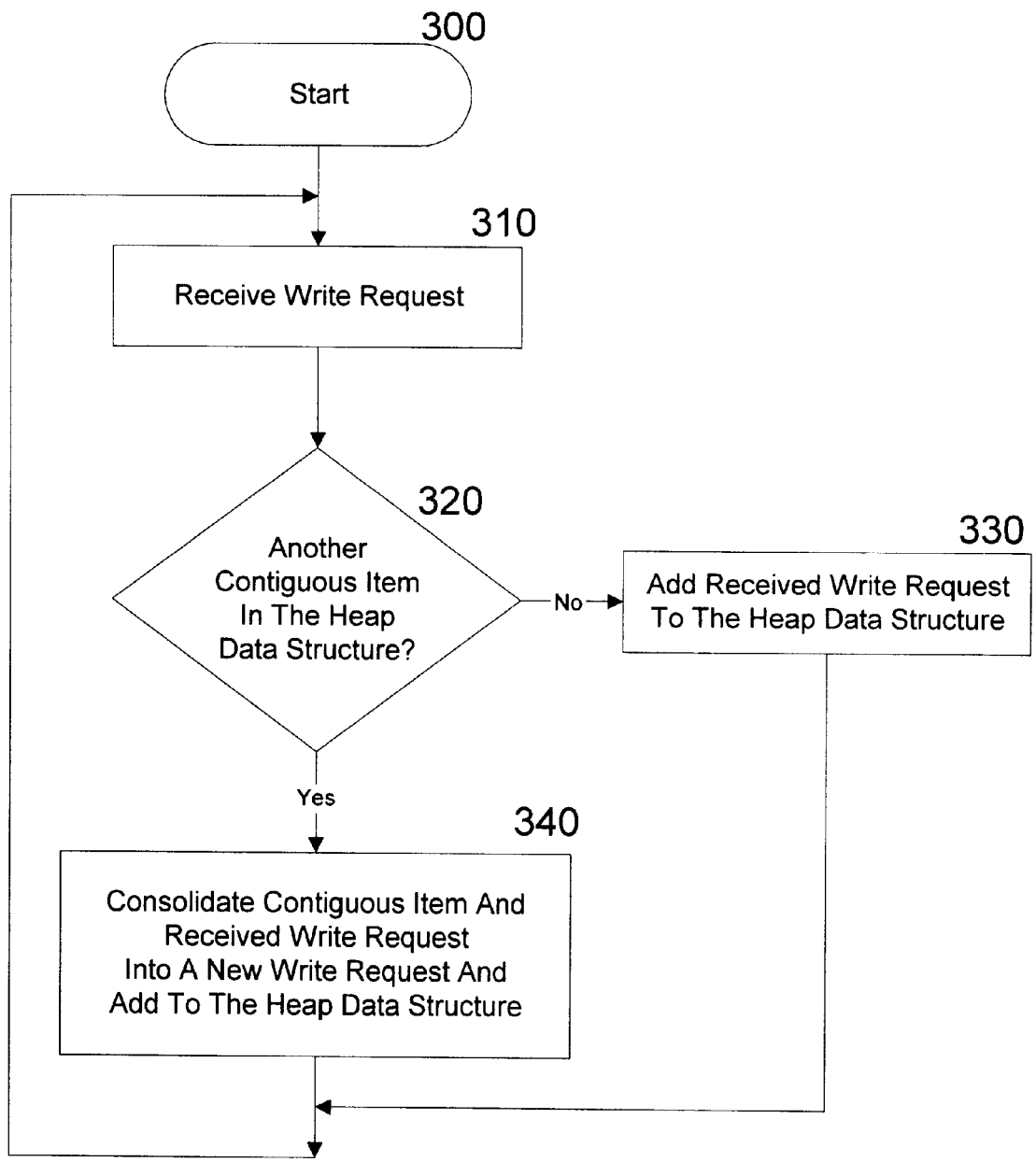
FIG. 3 is a flow diagram illustrating the processing of the data collector.

Turning now to FIG. 3, shown is a flow diagram for the processing of data collector 240 (FIG. 2A). First, in step 310, the data collector 240 receives a write request 260 (FIG. 2B). Next, in step 320, the data collector 240 determines whether there is another write request 260 corresponding to contiguous data items within the memory-mapped file 210.

As previously described herein, the data collector 240 stores write requests in a data structure. In one embodiment, this data structure is in the form of a heap data structure using the memory address 270 as its key. Heap data structures are known in the art for use in other contexts, and have the property of being able to efficiently retrieve, traverse and maintain data items ordered according to a key. Heaps and heap-ordered trees are discussed in Robert Endre Tarjan, Data Structures and Network Algorithms (1983) and is hereby incorporated by reference. One embodiment of the present invention uses the heap data structures provided by the Standard Template Library shipped with Microsoft Visual C++ 5.0, Microsoft Corporation (1997) and is hereby incorporated by reference along with its supporting documentation. As would be apparent to one skilled in the art, other data structures could be used, and other techniques used in determining whether two data items are contiguous, including sorting the data structure and comparing neighbors.

Using the heap data structure, the data collector 240 (FIG. 2A) efficiently maintains the write requests 260 (FIG. 2B) in an ordered fashion which makes it readily apparent when two data items are contiguous and thus can be consolidated into a single write request 260. If the data items of two write requests 260 are contiguous as determined in step 320, then step 340 is performed to consolidate the write requests. Otherwise, step 330 is performed to add the new write request 260 to the heap data structure. In either case, processing continues to step 310 to continue receiving and processing write requests 260.

Figure 4:
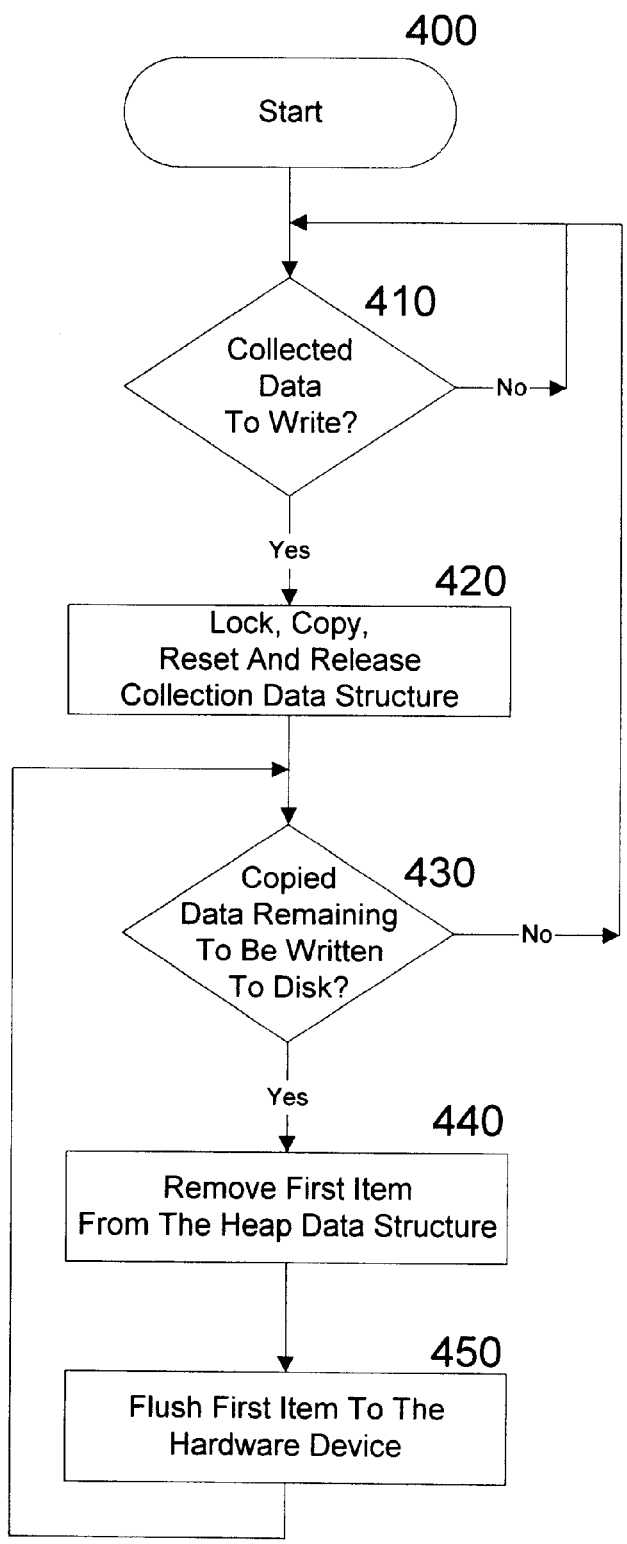
FIG. 4 is a flow diagram illustrating the processing of the data writer.

Turning to FIG. 4, shown is a flow diagram illustrating the processing of the data writer 250 (FIG. 2A). First, in step 410, the data writer 250 waits until there are one or more write requests 260 (FIG. 2B) stored in the data structure of the data collector 240. As soon as there is at least one item, processing continues to step 420 where the data writer 250 locks, copies, resets, and releases the data structure used by the data collector 240. In this manner, the data collector 240 will add newly received write requests 260 to an empty data structure according to the processing illustrated in FIG. 3 and previously described herein. In addition, the data writer 250 has a copy of one or more write requests 260 whose corresponding data values are to be stored to the hardware device. As previously described, numerous other techniques are possible for the data writer 250 to acquire the write requests stored in the data structure of the data collector in keeping with the scope and spirit of the invention.

Next, in step 430, the data writer checks to see if there are any more copied write requests remaining to be stored to the hardware device (e.g., disk). When it has no more items, processing returns to step 410 to acquire accumulated and consolidated write requests from the data collector 240. Otherwise, the data writer 250 has items to store and processing continues in step 440 where a first write request 260 is removed from the copied heap data structure. Then, in step 450, the data value (the number of bytes to flush 280 starting at memory address 270 of the write request 260 as illustrated in FIG. 2B) is stored on the hardware device at the desired location. In the Windows NT environment, the FlushViewOfFile command, described in FIG. 5, writes to the disk a byte range within a mapped view of a file. In other computing environments in which this invention is practiced, the storing to the hardware device function can use a command provided by the operating system, library or routine, or even implement the functionality within itself. After the FlushViewOfFile operation has been performed (and the data source 220 is optionally notified of the successful storage of the data item or items), processing returns to step 430 to determine whether there is any more copied items to store to the hardware device. In this manner, the data items referenced in the write requests are efficiently stored to the hardware device while the data collector accumulates, orders and consolidates new write requests.

In view of the many possible embodiments to which the principles of our invention may be applied, it will be appreciated that the embodiment described herein with respect to the drawing figures is only illustrative and should not be taken as limiting the scope of the invention. To the contrary, the invention as described herein contemplates all such embodiments as may come within the scope of the following claims and equivalents thereof.

What is claimed is:

1. In a computer system, a method for storing data generated by a data source to a hardware device by a data writer operating in a separate thread than a data collector, the method comprising the steps of: the data source generating a plurality of data items to be stored to the hardware device wherein at least a portion of the data items produced are to be stored contiguously on an area of the hardware device and are generated in an order other than one corresponding to the ordering for the contiguous area; the data collector accumulating and producing an ordered set of data items according to their position to be stored on the hardware device and consolidating at least two data items that are to be written to contiguous portions of the hardware device into a larger data item within the set; and the data writer acquiring the ordered set of data items from the data collector and storing the set of data items to the hardware device, and wherein the data source and the data collector are in the same execution thread.

2. The method of claim 1, wherein the data items are stored in a memory-mapped file.

3. The method of claim 1, wherein the data collector uses a heap data structure.

4. The method of claim 1, wherein the data items are stored in the same file.

5. The method of claim 1, wherein the data collector sorts the data items.

6. The method of claim 1, wherein the hardware device is a disk.

7. The method of claim 1, wherein an application program includes the data source, a device driver includes the data collector, and an operating system includes the data writer.

8. In a computer system, a method for storing data produced by a data source to a hardware device using a data writer operating in a separate thread than a data collector, the method comprising the steps of: the data source producing a plurality of data items to be stored on the hardware device wherein at least a portion of the data items produced are to be stored contiguously on an area of the hardware device and are produced in an order other than one corresponding to the ordering for the contiguous area; the data source producing an additional data item to be stored on the hardware device; the data collector adding the additional data item to a collector data structure of items or consolidating the item with an another item in the data structure if the additional item and the another item are to be written to contiguous portions of storage space in the hardware device; the data writer copying the data items from the collector data structure into a writer data structure when the data writer has no previously copied items remaining to be stored to the hardware device; and the data writer storing the data items in the writer data structure to the hardware device, and wherein the data source and the data collector are in the same execution thread.

9. The method of claim 8, further comprising the step of the data writer causing the collector data structure to be reset after copying the collector data structure.

10. The method of claim 8, wherein the data items are stored in a memory-mapped file.

11. The method of claim 8, wherein the data structure is a heap.

12. The method of claim 8, wherein the data collector sorts the data items.

13. The method of claim 8, wherein an application program includes the data source, a device driver includes the data collector, and an operating system includes the data writer.

14. In a computer system, a method for storing data produced by a data source to a hardware device using a data writer operating in a separate thread than a data collector, the method comprising the steps of: the data source producing a plurality of data items to be stored on the hardware device wherein at least a portion of the data items produced are to be stored contiguously on an area of the hardware device and are produced in an order other than one corresponding to the ordering for the contiguous area; the data collector acquiring a first data structure; the data collector adding one of the data items to the first data structure or consolidating the item with another item in the first data structure if the item and the another item are to be written to contiguous portions of storage space in the hardware device; the data writer acquiring the first data structure containing one or more items when there are no more data items in a second data structure remaining to be stored to the hardware device; the data writer storing the one or more items in the first data structure to the hardware device; the data collector acquiring the second data structure; the data collector adding a second item to the second data structure or consolidating the second item with a second another item in the second data structure if the second item and the second another item are to be written to contiguous portions of storage space in the hardware device; the data writer acquiring the second data structure containing one or more second items when the hardware device is available for writing and there are no more items in the first data structure remaining to be stored to the hardware device; and the data writer storing the one or more second items in the second data structure to the hardware device, and wherein the data source and the data collector are in the same execution thread.

15. The method of claim 14, wherein the data collector and data writer use more than two data structures to communicate data to be stored on the hardware device.

16. The method of claim 14, wherein the file is a memory-mapped file.

17. The method of claim 14, wherein the first and second data structures are heaps.

18. The method of claim 14, wherein the data collector sorts the data items.

19. The method of claim 14, wherein an application program includes the data source, a device driver includes the data collector, and an operating system includes the data writer.

20. In a computer system, a method for storing a plurality of data items received from a data source on a hardware device at discrete locations using a data writer and a data collector operating in separate threads, the method comprising the steps of: the data collector receiving and adding one of the plurality of data items to a data structure of items; the data collector or the data writer consolidating one or more of the data items stored in the data structure of items into a new data item; the data writer acquiring one or more items currently in the data structure when the data writer has no previously acquired items remaining to be stored to the hardware device; and the data writer storing the one or more items to the hardware device and wherein the data source and the collector are in the same execution thread.

21. The method of claim 20, wherein the data writer acquires the one or more items by copying the data items from the data structure.

22. The method of claim 20, wherein the data writer acquires the one or more items by reading the items from the data structure while the data collector adds newly received items to a second data structure.

23. The method of claim 22, further comprising the step of the data writer acquiring one or more items currently in the second data structure and storing the one or more items to the hardware device when the hardware device is available for writing and the data writer has no previously acquired items remaining to be stored to the hardware device.

24. The method of claim 20, wherein the data items are stored in a memory-mapped file.

25. The method of claim 20, wherein the data structure is a heap, and the one or more items in the data structure are maintained in an order corresponding to the location for storing the items on the hardware device.

26. In a computer system, a method for efficiently flushing portions of a memory-mapped file to a hardware device, the memory-mapped file comprising a portion of memory within the computer system and a portion of a storage area of the hardware device, the method comprising the steps of: a data collector receiving from a data source a plurality of write requests; the data collector adding the plurality of write requests to a data structure and consolidating two or more data items in the data structure if the two or more data items are to be written to contiguous portions of storage space in the hardware device; a data writer acquiring one or more write requests currently in the data structure when the data writer has no previously acquired items remaining to be stored to the hardware device; and the data writer storing the one or more items to the hardware device, and wherein the data source and the data collector are in the same execution thread.

27. The method of claim 26, wherein the data writer acquires the one or more items by copying the data items from the data structure.

28. The method of claim 26, wherein the data writer acquires the one or more items by reading the items from the data structure while the data collector adds newly received items to a second data structure.

29. The method of claim 28, further comprising the step of the data writer acquiring one or more items currently in the second data structure and storing the one or more items to the hardware device when the hardware device is available for writing and the data writer has no previously acquired items remaining to be stored to the hardware device.

30. The method of claim 26, wherein the data structure is a heap, and the data collector maintains the one or more items in the data structure in an order corresponding to the location for storing the items on the hardware device.

31. The method of claim 26, wherein the data collector sorts the data items.

32. The method of claim 26, wherein the hardware device is a disk.

33. The method of claim 26, wherein the computer system further comprises a network, and wherein the hardware device is connected via the network to the computer containing the portion of memory.

34. The method of claim 26, wherein the computer system further comprises a network, and wherein the memory-mapped file corresponds to at least one queue of a message queuing network.

35. The method of claim 26, wherein the computer system further comprises a network, and wherein each write request includes a memory location and an amount of data to store.

36. In a message queuing computer system, a method for maintaining a plurality of messages within a message queue comprising a memory-mapped file and using a data collector and a data writer operating in separate threads, the memory-mapped file including a portion of memory within the computer system and a portion of a storage area of a hardware device, the method comprising the steps of: a message queuing server receiving a plurality of messages, storing the plurality of messages within the portion of memory, and generating a plurality of write requests to flush memory locations corresponding to the stored messages; the data collector receiving the plurality of write requests, each write request including a memory location; the data collector processing each one of the plurality of write requests and either adding the one write request to a data structure or consolidating the one write request with another write request in the data structure; the data writer acquiring one or more write requests currently in the data structure when the data writer has no previously acquired write requests remaining to be stored to the hardware device; and the data writer storing a data value corresponding to the one or more write requests to the hardware device wherein the message queuing server and the data collector are in the same execution thread.

37. The method of claim 36, wherein the plurality of write requests are received by the data collector in an order other than one corresponding to sequential order according to the memory locations of the write requests.

38. The method of claim 36, wherein the data structure is a heap, and the data collector maintains the one or more items in the data structure in an order corresponding to the location for storing the items on the hardware device.

39. The method of claim 36, wherein the data collector sorts the data items.

40. The method of claim 36, wherein the data writer cquires the one or more write requests by copying the data items from the data structure.

41. The method of claim 36, wherein the data writer acquires the one or more items by reading the items from the data structure while the data collector adds newly received items to a second data structure.

42. The method of claim 41, further comprising the step of the data writer acquiring one or more items currently in the second data structure and storing the one or more items to the hardware device when the data writer has no previously acquired items remaining to be stored to the hardware device.

43. The method of claim 36, wherein the data value corresponding to each write request is determined by a memory address and an amount of data to store contained within the write request.

44. The method of claim 36, where the data value corresponding to each write request is contained within the write request.

45. A computer-readable medium having computer-executable instructions for performing steps for storing a plurality of data items received from a data source on a hardware device at discrete locations using a data writer and a data collector operating in separate threads, the steps comprising: the data collector receiving and adding one of the plurality of data items to a data structure of items; the data collector or the data writer consolidating one or more of the data items stored in the data structure of items into a new data item; the data writer acquiring one or more items currently in the data structure when the data writer has no previously acquired items remaining to be stored to the hardware device; and the data writer storing the one or more items to the hardware device, wherein the data source and the data collector are in the same execution thread.

46. The computer-readable medium of claim 45, wherein the data writer acquires the one or more items by copying the data items from the data structure.

47. The computer-readable medium of claim 45, wherein the data writer acquires the one or more items by reading the items from the data structure while the data collector adds newly received items to a second data structure.

48. The computer-readable medium of claim 47, having further computer-executable instructions for performing the steps of the data writer acquiring one or more items currently in the second data structure and storing the one or more items to the hardware device when the hardware device is available for writing and the data writer has no previously acquired items remaining to be stored to the hardware device.

49. The computer-readable medium of claim 45, wherein the data items are stored in a memory-mapped file.

50. The computer-readable medium of claim 45, wherein the data structure is a heap, and the one or more items in the data structure are maintained in an order corresponding to the location for storing the items on the hardware device.

51. A computer-readable medium having computer-executable instructions for performing steps for efficiently flushing portions of a memory-mapped file to a hardware device, the memory-mapped file comprising a portion of memory within a computer system and a portion of a storage area of the hardware device, the steps comprising: a data collector receiving from a data source a plurality of write requests; the data collector adding the plurality of write requests to a data structure and consolidating two or more data items in the data structure if the two or more data items are to be written to contiguous portions of storage space in the hardware device; a data writer acquiring one or more write requests currently in the data structure when the data writer has no previously acquired items remaining to be stored to the hardware device; and the data writer storing the one or more items to the hardware device, wherein the data source and the data collector are in the same execution thread.

52. The computer-readable medium of claim 51, wherein the data writer acquires the one or more items by copying the data items from the data structure.

53. The computer-readable medium of claim 51, wherein the data writer acquires the one or more items by reading the items from the data structure while the data collector adds newly received items to a second data structure.

54. The computer-readable medium of claim 53, having further computer-executable instructions for performing the steps of the data writer acquiring one or more items currently in the second data structure and storing the one or more items to the hardware device when the hardware device is available for writing and the data writer has no previously acquired items remaining to be stored to the hardware device.

55. The computer-readable medium of claim 51, wherein the data structure is a heap, and the data collector maintains the one or more items in the data structure in an order corresponding to the location for storing the items on the hardware device.

56. The computer-readable medium of claim 51, wherein the data collector sorts the data items.

57. The computer-readable medium of claim 51, wherein the hardware device is a disk.

58. The computer-readable medium of claim 51, wherein the computer system further comprises a network, and wherein the hardware device is connected via the network to the computer containing the portion of memory.

59. The computer-readable medium of claim 51, wherein the computer system further comprises a network, and wherein the memory-mapped file corresponds to at least one queue of a message queuing network.

60. The computer-readable medium of claim 51, wherein the computer system further comprises a network, and wherein each write request includes a memory location and an amount of data to store.

61. A computer-readable medium having computer-executable instructions for performing steps for maintaining a plurality of messages within a message queuing computer system in a message queue comprising a memory-mapped file and using a data collector and a data writer operating in separate threads, the memory-mapped file including a portion of memory within the computer system and a portion of the storage area of a hardware device, the steps comprising: a message queuing server receiving a plurality of messages, storing the plurality of messages within the portion of memory, and generating a plurality of write requests to flush memory locations corresponding to the stored messages; the data collector receiving the plurality of write requests, each write request including a memory location; the data collector processing each one of the plurality of write requests and either adding the one write request to a data structure or consolidating the one write request with another write request in the data structure; the data writer acquiring one or more write requests currently in the data structure when the data writer has no previously acquired write requests remaining to be stored to the hardware device; and the data writer storing a data value corresponding to the one or more write requests to the hardware device wherein the message queuing server and the data collector are in the same execution thread.

62. The computer-readable medium of claim 61, wherein the plurality of write requests are received by the data collector in an order other than one corresponding to sequential order according to the memory locations of the write requests.

63. The computer-readable medium of claim 61, wherein the data structure is a heap, and the data collector maintains the one or more items in the data structure in an order corresponding to the location for storing the items on the hardware device.

64. The computer-readable medium of claim 61, wherein the data collector sorts the data items.

65. The computer-readable medium of claim 61, wherein the data writer acquires the one or more write requests by copying the data items from the data structure.

66. The computer-readable medium of claim 61, wherein the data writer acquires the one or more items by reading the items from the data structure while the data collector adds newly received items to a second data structure.

67. The computer-readable medium of claim 66, having further computer-executable instructions for performing the steps of the data writer acquiring one or more items currently in the second data structure and storing the one or more items to the hardware device when the data writer has no previously acquired items remaining to be stored to the hardware device.

68. The computer-readable medium of claim 61, wherein the data value corresponding to each write request is determined by a memory address and an amount of data to store contained within the write request.

69. The computer-readable medium of claim 61, where the data value corresponding to each write request is contained within the write request.

* * * * *

UNITED STATES PATENT AND TRADEMARK OFFICE
CERTIFICATE OF CORRECTION

PATENT NO.    : 6,275,912 B1
DATED         : August 14, 2001
INVENTOR(S)   : Erez Haba It is certified that error appears in the above-identified patent and that said Letters Patent is hereby corrected as shown below:

<u>Column 12,</u>
Line 13, "device wherein" should read -- device, wherein --.
Line 27, "cquires" should read -- acquires --.

<u>Column 14,</u>
Line 27, "device wherein" should read -- device, wherein --.

Signed and Sealed this

First Day of July, 2003

JAMES E. ROGAN
*Director of the United States Patent and Trademark Office*